United States Patent [19]
Leksono et al.

[11] Patent Number: 6,067,308
[45] Date of Patent: May 23, 2000

[54] ELECTROLUMINESCENT SOLID STATE DEVICE

[75] Inventors: Moeljanto W. Leksono, Boulder, Colo.; Chang-Hua Qiu, North Brunswick, N.J.; Jacques Isaac Pankove, Boulder, Colo.

[73] Assignee: Astralux, Inc., Boulder, Colo.

[21] Appl. No.: 09/154,813

[22] Filed: Sep. 17, 1998

[51] Int. Cl.⁷ .................................................. H01S 3/16
[52] U.S. Cl. .............................. 372/41; 372/12; 372/13; 372/40; 372/43
[58] Field of Search ........................ 372/12, 13, 39, 372/40, 41, 43, 44, 45, 49, 50

[56] References Cited

U.S. PATENT DOCUMENTS

| | | | |
|---|---|---|---|
| 4,081,763 | 3/1978 | Vlasenko et al. | 372/41 X |
| 4,093,852 | 6/1978 | Olive et al. | 358/241 |
| 4,136,435 | 1/1979 | Li | 29/572 |
| 4,371,406 | 2/1983 | Li | 148/171 |
| 4,603,280 | 7/1986 | Pankove | 313/509 |
| 5,262,365 | 11/1993 | Oyobe et al. | 501/54 |
| 5,299,218 | 3/1994 | Ban et al. | 372/45 |
| 5,425,039 | 6/1995 | Hsu et al. | 372/6 |
| 5,596,671 | 1/1997 | Rockwell, III | 385/147 |

OTHER PUBLICATIONS

Article "A New Electroluminescent Display Device" by Jacques I. Pankove, Journal of Luminescence, pp. 97–99.

*Primary Examiner*—Brian Healy
*Attorney, Agent, or Firm*—Francis A. Sirr; Earl C. Hancock; Holland & Hart LLP

[57] ABSTRACT

An electroluminescent solid state device includes an active body member that is formed of a single crystalline metal oxide, such as aluminum oxide, that is doped with a rare earth element, such as erbium and/or terbium and an activator atom such as oxygen and/or fluorine. The metal oxide body member is electron excited by kinetic electrons that are emitted by a cold cathode. The ends of the metal oxide body member are polished to form a Fabry-Perot resonator, thus providing for coherent radiation from the device. As an alternative to the use of a Fabry-Perot cavity, an acoustic wave generator is associated with the metal oxide body member in order to launch acoustic waves into the body member. The frequency of energization of the acoustic wave generator operates to select a radiation wavelength from one or more emission wavelengths that are produced by doping the metal oxide body member with one or more rare earth elements.

29 Claims, 2 Drawing Sheets

ELECTROLUMINESCENT SOLID STATE DEVICE

BACKGROUND OF THE INVENTION

1. Field of the Invention

This invention relates to electroluminescent solid state devices, and more particularly, to an electroluminescent solid state device having a single crystalline metal oxide that is doped with one or more rare earth elements and an oxygen and/or fluorine activator atom.

2. Description of the Related Art

Solid state electroluminescent devices generally include a body of a single crystalline material that emits electromagnetic radiation when an electrical bias is placed across the body. The body generally includes means for causing the excitation of electrons in order to generate the radiation. Such means can include a PN junction within the body, or a metal insulator n type semiconductor (m-i-n) structure. The wavelength of the generated radiation is dependent on the composition of the material that comprises the body, including any dopants that are in the material.

Although early electroluminescent devices consisted of polycrystalline semiconductors, electroluminescent devices have been made from single crystalline semiconductor materials, particularly the group III–V compounds, and alloys thereof. It is known that doping a semiconductor with a rare earth element, such as erbium or terbium, provides a device that can generate radiation at a wavelength that is highly suitable for optical transmission purposes. However, it has been found that semiconductor devices that are doped with a rare earth element are not particularly efficient.

The concept of doping a transparent material with a rare earth element is known, for example, in U.S. Pat. No. 5,262,365 to Oyobe et al. This patent provides a silica-based glass that is doped with a rare earth element, aluminum, and fluorine. Oyobe seeks to avoid the crystallization problem that occurs when silica glass is co-doped with a rare earth element and aluminum. A $SiO_2$ host glass is doped with the rare earth element erbium, or neodymium, aluminum, and fluorine. The glass composition of this patent is expressed by a glass matrix of a $R_2O_3$ $Al_2O_3$ $SiO_3$ system, wherein R represents a rare earth element, and fluorine doping is conducted by substituting the oxygen of the system with fluorine.

The use of a doped crystal to form a laser is known. For example, U.S. Pat. No. 5,299,218 to Ban et al describes a blue light laser having the three embodiments shown in FIGS. 1–2, FIG. 3, and FIG. 4. In FIGS. 1–2, an active layer is activated by electrons that are emitted by tips that are within a field emission tip array. This array is energized by an electrostatic field application apparatus. The electrons pass through a vacuum space, and then impact the active layer. This active layer may be a doped alkali halide crystal, i.e. NaI doped with Tl (NaI:Tl), LiI:Eu, or CsI:Tl, or the active layer may be an un-doped alkali halide crystal, i.e. NaI, or the active layer may be an anthracene crystal, a trans-stilbene crystal, or the like. In the FIG. 3 embodiment, the active layer is a fiber that acts as a light waveguide. The remainder of the FIG. 3 device is the same as FIGS. 2, 3. This active layer is formed by crystal growth of anthracene. In the FIG. 4 embodiment, the active layer is an alkali halide doped, or undoped crystal, or an organic crystal and the remainder of the structure is the same as the FIGS. 1, 2 embodiment.

Also of general interest relative to wavelength tuning is U.S. Pat. No. 5,425,039 to Hsu et al wherein a tunable, single frequency, fiber optic laser is provided having an erbium:yttererbium phosphate glass fiber, or erbium:ytterbium phospho-silica glass fiber. A rare earth ion doped glass fiber is also mentioned. Wavelength tuning is achieved by temperature variation of laser gain cavity length, or by electromechanical variation of laser gain cavity length. Electromechanical tuning with a PZT transducer is also mentioned.

While prior devices have been generally useful for their limited intended purposes, it would be desirable to have an electroluminescent device that is doped with a rare earth element to achieve radiation at the desired wavelength, but which is formed of a material that provides greater efficiency to the device.

SUMMARY OF THE INVENTION

The present invention is directed to an electroluminescent solid state device that includes a single crystalline metal oxide body that is doped with one or more rare earth elements, and with oxygen and/or fluorine. Electron activation means are provided for injecting kinetic electrons into the body in order to generate radiation within the body.

This invention provides an electroluminescent device (10 of FIG. 2) having a body of single crystalline metal oxide (20 of FIG. 2) that is doped with one or more rare earth elements and with oxygen and/or fluorine, in combination with a means (24 of FIG. 2) for injecting kinetic electrons into the body in order to generate radiation within the body.

In one embodiment of the invention, the two opposite ends of the elongated body of single crystalline metal oxide are parallel and are mirror polished to form a Fabry-Perot cavity, and thus provide for the body's coherent electromagnetic radiation output.

In another embodiment of the invention, an acoustic wave generator (200 of FIG. 4) is provided on the body of single crystalline metal oxide in order to launch acoustic waves that travel back and forth down the length of the body. In this embodiment, the frequency of energization of the acoustic wave generator operates to control the wavelength of the body's coherent electromagnetic radiation output.

An object of this invention is to provide an excitation means (for example, a cold cathode excitation means), for impact exciting a single crystalline metal oxide body with electrons to thereby generate radiation within the body. The body is arranged to emit the generated radiation from a surface thereof. The body comprises a Fabry-Perot cavity, or the body is provided with a piezoelectric structure that sends acoustic waves through the body in a manner to define the emission wavelength of device.

In an embodiment of the invention, the body comprises single crystalline aluminum oxide that is doped with a rare earth element, such as erbium and/or terbium and with oxygen and/or fluorine.

The rare earth element is essential to the production of electromagnetic, or light emission from the metal oxide body, and the oxygen and/or fluorine atoms attach to the atoms of the rare earth element(s) and operate to put the rare earth element(s) into a 3+ state that is needed for emission to occur.

When the doped metal oxide body is impacted with kinetic electrons, energy is provided to one of the remaining electrons of the rare earth element(s), promoting the rare earth element(s) to a higher energy "excited" state, and emitting the difference energy between the "excited" state and a ground state as radiation.

These and other objects, features and advantages of this invention will be apparent to those of skill in the art upon reference to the following detailed description, which description makes reference to the drawing.

DESCRIPTION OF THE PREFERRED EMBODIMENT

Figure 1:
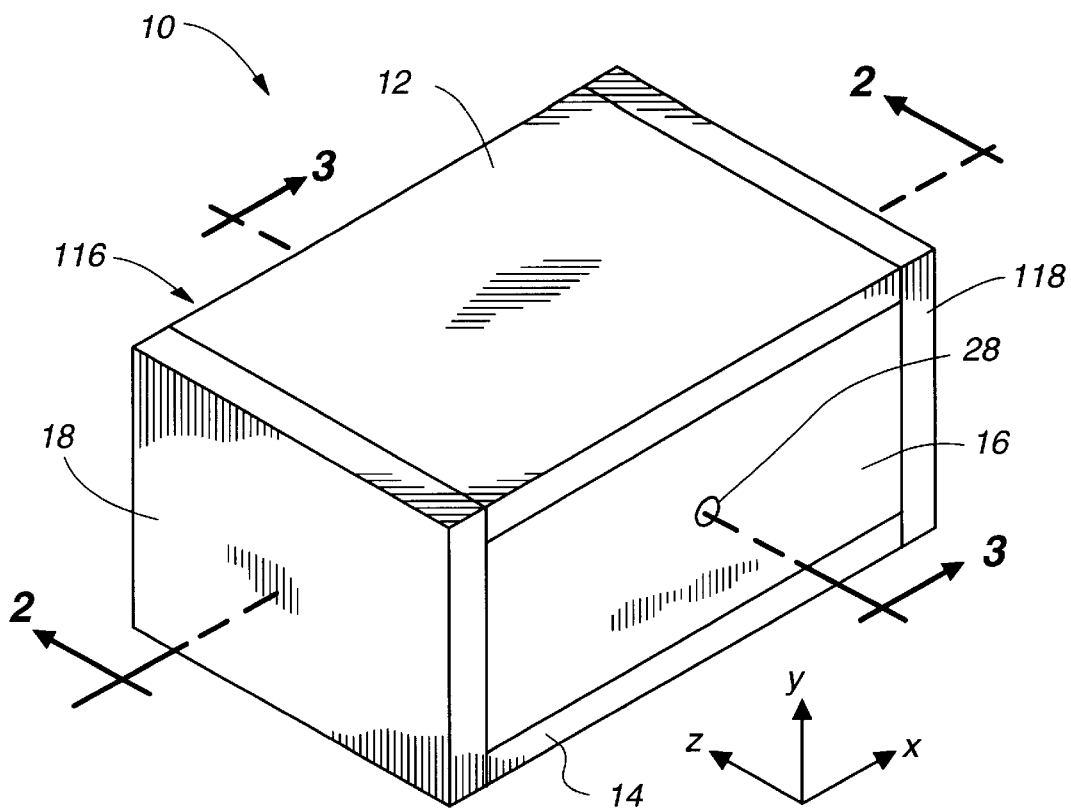
FIG. 1 is a top and side perspective view of a box-shaped solid state electroluminescent device in accordance with the invention, this figure including a three-dimensional coordinate system wherein the X-direction identifies the length of the device, the Y-dimension identifies the height of the device, and the Z-dimension identifies the width of the device.

FIG. 1 is a top and side perspective view of an elongated box-shaped solid state electroluminescent device 10 in accordance with the invention. In FIG. 1, the X-direction identifies the length of device 10, the Y-dimension identifies the height of device 10, and the Z-dimension identifies the width of device 10.

While physical size is not a limitation on the spirit and scope of this invention, as an example, device 10 may have a length of in the range of about 1.0 to 10.0 millimeters, a height in the range of about 1.0 to 5.0 millimeters, and a width in the range of about 0.1 to 1.0 millimeters.

Device 10 comprises six generally flat, or planar, walls that define a sealed or air-tight box-shaped housing. A top wall 12 comprises an electrically conductive metal plate. Top wall 12 is generally parallel to a bottom wall 14 that is also formed of an electrically conductive metal plate. The material from which metal plates 12, 14 are formed is not critical, and aluminum, gold or nickel can be used.

The two end walls 18, 118 are formed of an electrically insulating material, preferably they are mutually parallel, and at least one of the two walls 18, 118 is transparent to the electromagnetic radiation that is emitted externally of device 10. Again, the material from which end walls 18, 118 are formed is not critical to the invention.

The two side walls 16, 116 are also formed of an electrically insulating material, and preferably are mutually parallel. Each side wall 16, 116 includes a generally centrally located, metal, and cylindrical electron focusing lens 28, 128, each the metal lens 28, 128 being biased by the application of a negative-polarity DC voltage (see 52 of FIG. 3). The material from which side walls 16, 16 and lens electrodes 28, 28 are formed are not critical to the invention.

Figure 2:
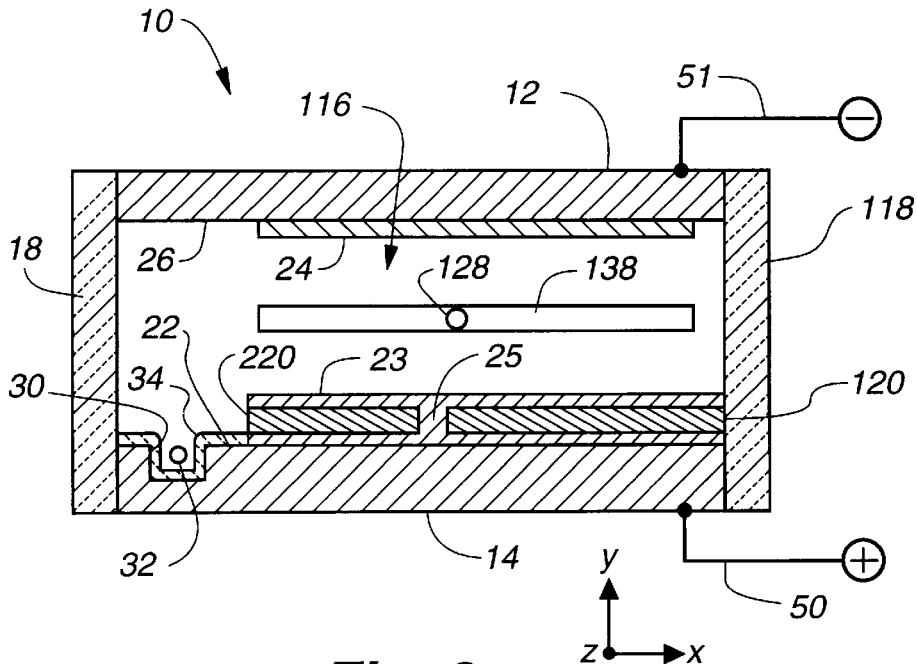
FIG. 2 is a section view taken in a X-Y plane that is identified by a dotted line 2 in FIG. 1.
Figure 3:
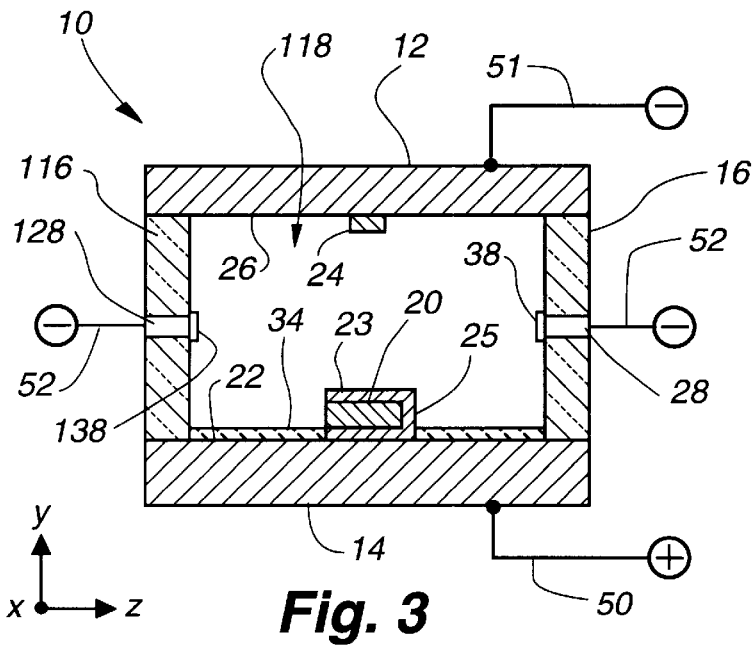
FIG. 3 is a section view taken in a Y-Z plane that is identified by a dotted line 3 in FIG. 1, FIGS. 2 and 3 comprising an embodiment of the invention having a Fabry-Perot cavity.

FIGS. 2 and 3 show an embodiment of an electroluminescent solid state device 10 wherein an internal radiation generator in the form of a body 20 is formed as a Fabry-Perot cavity.

Body 20 is formed of a single crystalline metal oxide that is selected from the group $Al_2O_3$ (sapphire), ZnO, MgO, $LiNbO_3$, $TiO_3$, $SrTiO_3$, $BaTiO_3$ and quartz. Single crystalline metal oxide body 20 is doped with one or more rare earth elements selected from the group erbium, terbium, praseodymium, neodymium, samarium, europium, dysprosium, holmium, thulium and ytterbium, and with an activator atom that is selected from the group oxygen and/or fluorine.

Of the above-noted single crystalline metal oxides, sapphire (single crystalline aluminum oxide), $LiNbO_3$, and $BaTiO_3$ are preferred. Use of erbium as the rare earth element results in infra-red radiation. Use of terbium as the rare earth element results in green radiation.

For example, single crystalline metal oxide body 20 can be doped with the rare earth element(s) to a level of about $10^{18}$ to about $10^{19}$ atoms per cubic centimeter, and can be doped with oxygen and/or fluorine to a level of about $10^{20}$ atoms per cubic centimeter.

Device 10 includes an electron excitation means 24 (for example, a cold cathode excitation means 24), for impact exciting single crystalline metal oxide body 20 with electrons, to thereby generate radiation within body 20. Body 20 may be arranged to emit the generated radiation from a surface thereof, or from an edge thereof. In order to form device 10 into a laser that emits substantially coherent radiation, body 20 is constructed as a Fabry-Perot cavity.

Figure 4:
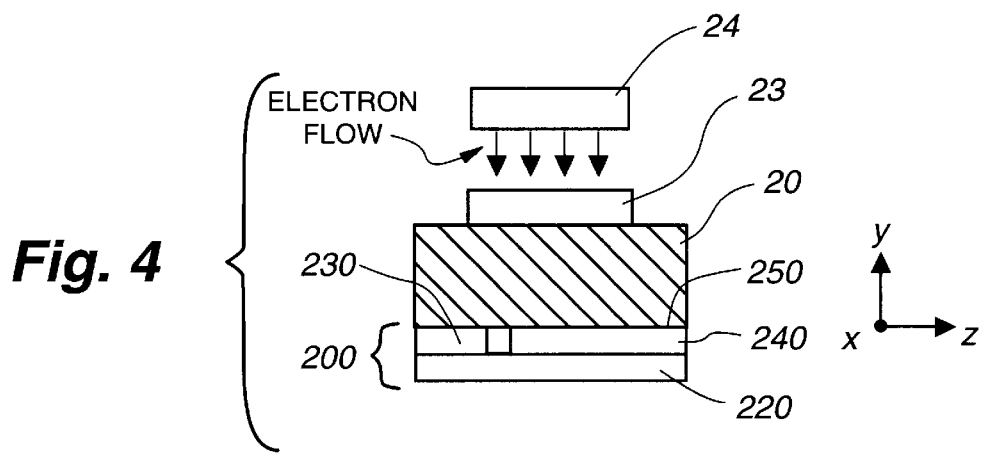
FIG. 4 is an end view of an elongated electroluminescent body that is contained within the electroluminescent device of FIG. 1, this view showing in greater detail, a metal contact layer or electrode that covers the top surface of the electroluminescent body, and this view also showing an embodiment of the invention wherein an acoustic wave generator in the form of a piezoelectric transducer having a pair of metal interdigitated finger electrodes that are provided on the bottom surface of the electroluminescent body.
Figure 5:
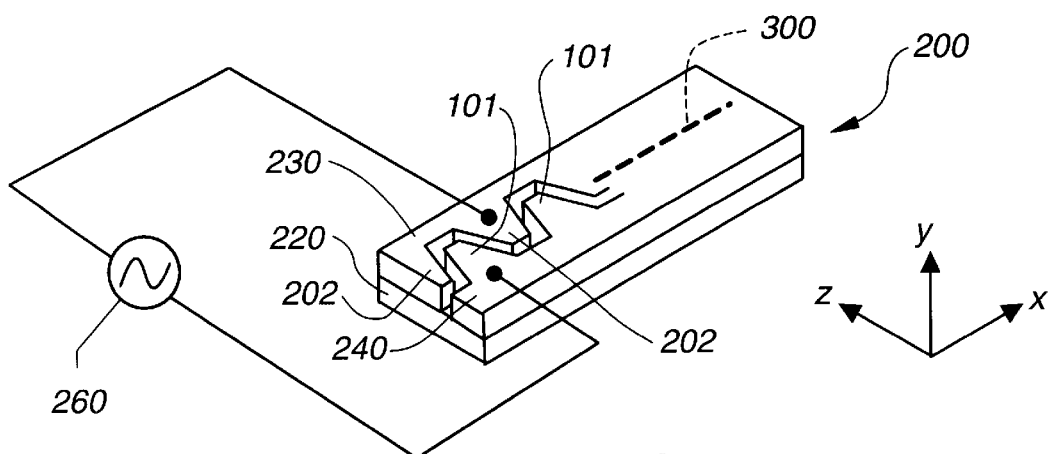
FIG. 5 is a top and side perspective view of the piezoelectric transducer of FIG. 4, this view showing the transducer's pair of physically spaced and interdigitated finger electrodes.

It is to be noted that in an embodiment of the invention to be described relative to FIGS. 4 and 5, body 20 is provided with an acoustic wave generator in the form of a piezoelectric (PZT) transducer 200 that forms a distributed feedback Bragg reflector that defines the radiation wavelength of device 10.

The Fabry-Perot cavity of FIGS. 2 and 3 defines the resonant mode that is needed to produce lasing action, whereas PZT transducer 200 of FIGS. 4 and 5 operates to fine tune the radiation wavelength of the laser output. That is, when two or more rare earth elements are used to dope single crystalline metal oxide body 20, PZT transducer 200 operates to provide for the selection of the one of two or more radiation wavelength that will in fact lase.

An embodiment of a device 10 in accordance with the invention included a sapphire electroluminescent body 20. Sapphire body 20 was implanted with $Er^{2+}$ (i.e., double ionized erbium) at 400 kV with a dose of $10^{15}$ ions per square centimeter, and was implanted with oxygen at 80 kV at a dose of $10^{16}$ ions per square centimeter. Sapphire body 20 was annealed at 900-degrees centigrade for one hour in 10 Torr of $NH_3$. Such a sapphire body 20 can also be annealed in other gases, such as nitrogen or oxygen, in vacuum or in ambient air.

In one aspect of the invention, an electroluminescent device is provided having an $Al_2O_3$ single crystalline metal oxide body that is doped with a rare earth element(s) that is selected from the group erbium and/or terbium, having the addition of an element(s) that is selected from the group oxygen and/or fluorine, and having electron injection means for injecting kinetic electrons into the $Al_2O_3$ single crystalline metal oxide body in order to generate electroluminescent radiation from the $Al_2O_3$ single crystalline metal oxide body.

As seen in FIGS. 2 and 3, an X-direction elongated electroluminescent body 20 is located on the inner and top surface 22 of metal bottom plate 14, one end 120 of body 20 being located adjacent to the inner surface of end wall 118. A metal contact layer 23 extends along the top surface of body 20. A narrow extension 25 of contact layer 23 extends down one side of body 20, and along at least a portion of the bottom surface of body 20, so as to make electrical contact with the inner and top surface 22 of metal bottom plate 14.

An electron excitation means in the form of a cold cathode 24 is located on the inner and bottom surface 26 of top metal plate 12. As seen in FIG. 2, cold cathode 24 is generally aligned with electroluminescent body 20. That is, cold cathode 24 extends over and along most of the X-direction length of electroluminescent body 20. Electron excitation means 24 may also comprise a line of field emitters, or a line of negative electron affinity material, such as diamond, AlN, or p-type GaN that is treated with a low work function material, as described in the article by J. I. Pankove and H. Schade, APPLIED PHYSICS LETTERS, Vol. 25, p 53, 1974.

As seen in FIG. 3, each of the two side walls 16, 116 includes a cylindrical electron focusing lens 28, 128. The metal lens 28, 128 are generally aligned in the Z-direction, and include two parallel elongated electrodes 38, 138 that run along the interior of side walls 16 and 116, parallel to cold cathode 24 and anode electrode 23. The lens system 28, 128, 38, 138 operates to optimize the electron current density that flows between cold cathode 24 and body 20 via its metal anode electrode 23. In practice, a positive DC voltage 50 is applied to body 20, a negative DC voltage 51 is applied to cold cathode 24, and a negative DC voltage 52 is applied to each of the two lens electrodes 28, 128, as is shown in FIG. 2 at 50, 51 and 52, respectively. By way of example only, DC voltages 51 and 52 may be in the range of about 10 to 1000 DCV, while body 20 is at ground potential. Alternatively, cold cathode 24 may be at ground potential, while body 20 is biased positively by a VC voltage in the range of about 10 to 1000 volts.

As shown in FIG. 2, in an embodiment of the invention, bottom metal plate 14 included a groove 30 within its inner surface 22 adjacent the end 220 of body 20, and a layer of electrical insulating material 34 was coated over the inner surface 22 of bottom metal plate 14, around body 20, and over groove 30. A getter 32 (for example, a filament of Ti), was located within groove 30. Getter 32 was flashed in order to provide for evacuating the FIG. 1 housing that is formed by top and bottom metal plates 12 and 14, electrically insulating side walls 16, 116, and electrically insulating end walls 18, 118.

In another embodiment, getter 32 and groove 30 were not used. In the alternative, the box-shaped housing of FIG. 1 was closed and sealed in a vacuum, thus avoiding the need for getter 32 and simplifying the inner surface shape of bottom wall 14.

In operation of electroluminescent device 10, negative voltage 51 is applied to cold cathode 24 through top metal wall 12, as positive voltage 50 is applied to body 20 through bottom metal wall 14. This DC voltage potential difference causes cold cathode 24 to emit electrons that are directed toward electroluminescent body 20. Negative DC bias voltage 52 is applied to the two metal electron focusing lenses 28, 128 to optimize the flow of electrons from cold cathode 24 to body 20. This flow of electrons impinges on contact layer 23, and then enters body 20 where the rare earth doping element(s) within body 20 is excited by this kinetic electron impact. This results in the generation of radiation within and from body 20.

Electrons entering body 20 impact and excite the rare earth element(s), causing the emission of electromagnetic radiation. This radiation is emitted from the end 120 of body 20 that is adjacent to end wall 118. As a result, electromagnetic radiation exits device 10 through end wall 118. Since the ends 120, 220 of body 20 are polished and are substantially parallel in FIGS. 2 and 3 to thus form a Fabry-Perot cavity, substantially coherent radiation is emitted from body 20.

In an embodiment of the invention, where erbium is the rare earth doping element and where oxygen is also present as an activator, the erbium atoms are in a 3+ state because the erbium atoms have given up the outer three electrons to neighboring oxygen atoms. The bombarding electrons that thereafter originate from cold cathode 24 give their kinetic energy to the remaining electrons within the erbium atoms, thus promoting the erbium atoms to an excited state from which the erbium atoms then return to the lower ground state, thus emitting as radiation a different energy that is represented by the quantity $E_{excited}-E_{ground}$.

FIGS. 4 and 5 show an embodiment of the invention, wherein a piezoelectric transducer 200 is provided on the bottom surface 250 of electroluminescent body 20. Acoustic transducer 200 comprises a bottom layer 220 of piezoelectric material and two top metal contact layers 230 and 240 that are individually connected to the two output terminals of a source of AC voltage 260. PZT layer 220 and contact layers 230, 240 may comprise a thin film layers.

Metal layers 230, 240 are physically separated, and are physically patterned to form a pair of interdigitated finger electrodes 101, 202. The wavelength of the coherent radiation that is emitted from body 20 is selected, or fine tuned, by generating a grating of acoustic waves in the X-Z plane within body 20. These acoustic waves are generated by the piezoelectric transducer 200 that is formed on the bottom surface 250 of body 20.

The frequency of AC source 260 that is connected to drive or energize transducer 200 by application of an AC voltage to electrodes 230, 240, is adjusted so that the wavelength of the acoustic waves that are generated within body 20 is a sub-harmonic of the optical wavelength of the coherent radiation that is to be emitted from body 20.

When body 20 is provided with such an acoustic transducer 200, body 20 need not comprise a Fabry-Perot cavity, since the transducer's acoustic waves form a distributed feedback that induces coherence of the emitted radiation. Stated another way, a laser requires a resonant structure that causes light to bounce back and forth between two properly spaced mirror surfaces 120–220 of body 20. In a Bragg reflector as provided by transducer 200, the reflection is periodic at each maximum of the acoustic wave.

Transducer layer 220 may be formed of $LiNbO_3$ or $BaTiO_3$. The pair of physically spaced and interdigitated metal finger electrodes 101, 201 that are located adjacent to the bottom side or surface 250 of transducer 200 operate to launch an acoustic wave within body 20 by virtue of physical deformation of PZT layer 220. As shown by dotted line 300, the pattern of interdigitated fingers 101, 201 is preferably repeated down the entire X-direction length of body 20 between its two ends 120, 220.

In operation, transducer 200 generates sound, or acoustic waves, that travel in opposite directions along the X-direction length of body 20. The sum of these opposite direction sound waves forms a stationary, or fixed, position grating. The size and X-direction spacing of fingers 101, 202 is such that the acoustic waves generated by transducer 200, and the optical waves generated within body 20 must be in phase, one being the harmonic of the other.

Thus, there is provided by the present invention an electroluminescent solid state device 10 that includes a single crystalline metal oxide electroluminescent body 20 body that is doped with both a rare earth element and an activator atom. The activator atom within the metal oxide body raises the ionization of the rare earth element to +3, so that when the rare earth element is impacted by electrons, the rare earth element causes the generation of, and the emission of, electromagnetic radiation.

Body 20 is only slightly temperature sensitive in that there is only a small drop in radiation emission over a wide range of temperatures. Body 20 provides radiation at several wavelengths when more than one rare earth element is present therein. Body 20 may be tuned, using transducer 200 of FIGS. 4 and 5, to cause only a desired one of several wavelengths to be emitted as coherent radiation.

As described above, erbium and oxygen are implanted into a metal oxide body, such as sapphire, and the body is then annealed. The erbium/oxygen doping can be achieved by the well-known technique of ion beam implanting, or these materials can be included in the melt when the single crystalline metal oxide material is grown.

While the bombarding of the sapphire body with a massive ion may cause bond breaking and disorder within the sapphire body, annealing allows bond reconstruction and repair of the crystal structure. The implanted doping material may reside in an interstitial site within the single crystal (i.e., in an open space between bonded atoms in the crystal, this space being many times larger than a rare earth atom), in which case, the crystal remains unstressed. On the other hand, the doping material may substitute for an aluminum atom or an oxygen atom, thus causing a local deformation of the crystal lattice and local stress.

However, in the case where rare earth ions are used as doping materials, the local stresses do not suppress the luminescent properties of the rare earth ion. The reasons for this indifference of the host crystal is that luminescence occurs between states belonging to the inner core electrons of the rare earth ion. These electrons belong to the rare earth ion and remain so localized that they do not sense the presence of adjacent crystal atoms.

Therefore, in either the interstitial or the substitutional case, the luminescent behavior of the rare earth is not strongly affected by crystal disorder. In fact, rare earth doped glass fibers are not crystalline, and they are structurally highly disordered and yet they are used for laser amplifiers.

While this invention has been described in detail while making reference to preferred embodiments thereof, it is known that others skilled in that art will, upon learning of this invention, readily visualize yet other embodiments that are within the spirit and scope of this invention. Therefore, it is not intended that the above detailed description be taken as a limitation on this invention.

What is claimed is:

1. A solid state electroluminescent laser comprising:
   an elongated, single crystalline, metal oxide body selected from the group $Al_2O_3$ (sapphire), ZnO, MgO, $LiNbO_3$, $TiO_3$, $SrTiO_3$, $BaTiO_3$ and quartz that is doped with one or more rare earth elements selected from the group erbium, terbium, praseodymium, neodymium, samarium, europium, dysprosium, holmium, thulium and ytterbium and with a rare earth ionizing element selected from the group oxygen and fluorine, said rare earth ionizing element atom operating to ionize said one or more rare earth elements;
   an elongated electron emitter spaced from and aligned with said elongated single crystalline metal oxide body;
   kinetic electrons emitted from said electron emitter operating to impact said one or more rare earth elements and to raise the energy of electrons of said one or more rare earth elements to an excited state above a ground state, such that upon return of said one or more rare earth elements to said ground state, radiation is emitted by said one or more rare earth elements; and
   means operable to render said emitted radiation coherent.

2. The solid state electroluminescent laser of claim 1 wherein said means operable to render said emitted radiation coherent is a Fabry-Perot cavity that includes said elongated, single crystalline, metal oxide body.

3. The solid state electroluminescent laser of claim 1 wherein said means operable to render said emitted radiation coherent is an acoustic generator that is associated with said elongated, single crystalline, metal oxide body in a manner to produce a standing wave within said elongated, single crystalline, metal oxide body.

4. The solid state electroluminescent laser of claim 3 wherein said standing wave is a sub-harmonic of the wavelength of said coherent radiation.

5. The solid state electroluminescent laser of claim 1 including:
   electron flow focusing means associated with said elongated, single crystalline, metal oxide body and said elongated electron emitter in a manner to focus a flow of electrons from said elongated electron emitter to said elongated, single crystalline, metal oxide body.

6. The solid state electroluminescent laser of claim 5 wherein said means operable to render said emitted radiation coherent is a Fabry-Perot cavity that includes said elongated, single crystalline, metal oxide body.

7. The solid state electroluminescent laser of claim 5 wherein said means operable to render said emitted radiation coherent is an acoustic generator that is associated with said elongated, single crystalline, metal oxide body in a manner to produce a standing wave within said elongated, single crystalline, metal oxide body.

8. The solid state electroluminescent laser of claim 7 wherein said standing wave is a sub-harmonic of said coherent radiation.

9. A solid state electroluminescent laser comprising:
   an elongated, single crystalline, metal oxide body selected from the group $Al_2O_3$ (sapphire), $LiNbO_3$ and $SrTiO_3$ that is doped with one or more rare earth elements erbium and terbium, and with a rare earth ionizing element selected from the group oxygen and fluorine, said rare earth ionizing element operating to ionize said one or more rare earth elements;
   an elongated electron emitter spaced from said elongated single crystalline metal oxide body;
   kinetic electrons emitted from said electron emitter operating to impact said one or more rare earth elements, and to raise the energy of electrons of said one or more rare earth elements, such that upon a return of the ionization level of said one or more rare earth elements, radiation is emitted by said one or more rare earth elements; and
   means operable to render said emitted radiation coherent.

10. The solid state electroluminescent laser of claim 9 wherein said means operable to render said emitted radiation coherent is a Fabry-Perot cavity that includes said elongated single crystalline metal oxide body.

11. The solid state electroluminescent laser of claim 9 wherein said means operable to render said emitted radiation coherent is an acoustic generator that is associated with said elongated single crystalline metal oxide body in a manner to produce acoustic and optical standing waves within said elongated single crystalline metal oxide body.

12. The solid state electroluminescent laser of claim 11 wherein said standing wave is a sub-harmonic of the wavelength of said coherent radiation.

13. The solid state electroluminescent laser of claim 9 including:
   electron flow focusing means associated with said elongated single crystalline metal oxide body and said elongated electron emitter in a manner to focus a flow of electrons from said elongated electron emitter to said elongated single crystalline metal oxide body.

14. The solid state electroluminescent laser of claim 13 wherein said means operable to render said emitted radiation coherent comprises said elongated single crystalline metal oxide body operating as a Fabry-Perot cavity.

15. The solid state electroluminescent laser of claim 13 wherein said means operable to render said emitted radiation coherent is an acoustic generator that is associated with said elongated single crystalline metal oxide body in a manner to produce a standing wave within said elongated single crystalline metal oxide body.

16. The solid state electroluminescent laser of claim 15 wherein said standing wave is a sub-harmonic of said coherent radiation.

17. The solid state electroluminescent laser of claim 9:
   wherein said an elongated single crystalline metal oxide body is $Al_2O_3$ (sapphire) that is doped with erbium; and
   wherein said coherent radiation is infra-red radiation at about 1.5 micrometers.

18. The solid state electroluminescent laser of claim 9:
   wherein said elongated single crystalline metal oxide body is $Al_2O_3$ (sapphire) that is doped with terbium; and
   wherein said coherent radiation is green light.

19. An electroluminescent device comprising:
   a closed housing having a top metal wall, a bottom metal wall, a pair of insulating end walls, at least one of which is transparent, and a pair of insulating side walls;
   an elongated, single crystalline, metal oxide body selected from the group $Al_2O_3$ (sapphire), ZnO, MgO, $LiNbO_3$, $TiO_3$, $SrTiO_3$, $BaTiO_3$ and quartz that is doped with one or more rare earth elements selected from the group erbium, terbium, praseodymium, neodymium, samarium, europium, dysprosium, holmium, thulium and ytterbium and with a rare earth ionizing element selected from the group oxygen and fluorine, said rare earth ionizing element atom operating to ionize said one or more rare earth element;
   said single crystalline metal oxide body being mounted on an interior surface of said bottom metal wall;
   an elongated electron emitter mounted on an interior surface of said top wall so as to be spaced from and aligned with said single crystalline metal oxide body;
   first power supply means for applying a negative potential to said electron emitter relative to said single crystalline metal oxide body to thereby cause electrons to be emitted from said electron emitter and to flow to said single crystalline metal oxide body, said emitted electrons operating to impact said one or more rare earth elements and to raise the energy of electrons of said one or more rare earth elements to an excited state above a ground state, such that upon return of said one or more rare earth elements to said ground state, radiation is emitted by said one or more rare earth elements and out of said at least one end wall of said housing;
   means associated with said single crystalline metal oxide body operable to render said emitted radiation coherent;
   electrostatic focusing means mounted in said side walls; and
   second power supply means operating to apply a negative potential to said electron flow focusing means to thereby focus a flow of electrons from said electron emitter to said single crystalline metal oxide body.

20. The electroluminescent device of claim 19 wherein said means operable to render said emitted radiation coherent comprises said single crystalline metal oxide body operating as a Fabry-Perot cavity.

21. The electroluminescent device of claim 19 wherein said means operable to render said emitted radiation coherent comprises an acoustic generator that is associated with said single crystalline metal oxide body in a manner to produce an acoustic standing wave within said single crystalline metal oxide body.

22. The electroluminescent device of claim 21 wherein said acoustic standing wave is a sub-harmonic of the wavelength of said coherent radiation.

23. The electroluminescent device of claim 22 wherein said closed housing contains a vacuum.

24. An electroluminescent device comprising:
   a closed housing having a top metal wall, a bottom metal wall, a pair of insulating end walls, at least one of which is transparent, and a pair of insulating side walls;
   an elongated, single crystalline, metal oxide body selected from the group $Al_2O_3$ (sapphire), $LiNbO_3$ and $SrTiO_3$ that is doped with one or more of the rare earth elements erbium and terbium and with a rare earth ionizing element selected from the group oxygen and fluorine, said rare earth ionizing element operating to ionize said one or more rare earth elements;
   said single crystalline metal oxide body being mounted on an interior surface of said bottom metal wall;
   an elongated electron emitter mounted on an interior surface of said top wall so as to be spaced from and aligned with said single crystalline metal oxide body;
   first power supply means for applying a negative potential to said electron emitter relative to said single crystalline metal oxide body to thereby cause electrons to be emitted from said electron emitter and to flow to said single crystalline metal oxide body, said emitted electrons operating to impact said one or more rare earth elements and to raise the energy of electrons of said one or more rare earth elements to an excited state above a ground state, such that upon return of said one or more rare earth elements to said ground state, radiation is emitted by said one or more rare earth elements and out of said at least one end wall of said housing;
   means associated with said single crystalline metal oxide body operable to render said emitted radiation coherent;
   electrostatic electron flow focusing means mounted in said side walls; and
   second power supply means operating to apply a negative potential to said electron flow focusing means to thereby focus a flow of electrons from said electron emitter to said single crystalline, metal oxide body.

25. The electroluminescent device of claim 24 wherein said means operable to render said emitted radiation coherent comprises said single crystalline metal oxide body operating as a Fabry-Perot cavity.

26. The electroluminescent device of claim 24 wherein said means operable to render said emitted radiation coherent comprises an acoustic generator that is associated with said single crystalline metal oxide body in a manner to produce a standing wave within said single crystalline metal oxide body.

27. The electroluminescent device of claim 26 wherein said standing wave is a sub-harmonic of the wavelength of said coherent radiation.

28. The electroluminescent device of claim 24:

wherein said single crystalline metal oxide body is $Al_2O_3$ (sapphire) that is doped with erbium; and wherein said coherent radiation coherent is infra-red radiation.

29. The electroluminescent device of claim 2:

wherein said single crystalline metal oxide body is $Al_2O_3$ (sapphire) that is doped with terbium; and wherein said coherent radiation coherent is green radiation.

* * * * *